United States Patent [19]

Phillips

[11] 3,784,160
[45] Jan. 8, 1974

[54] VEHICLE SUPPORT SYSTEM

[75] Inventor: David P. Phillips, Lookout Mountain, Tenn.

[73] Assignee: Wildwood Products, Inc., Lookout Mountain, Tenn.

[22] Filed: Nov. 9, 1972

[21] Appl. No.: 305,123

[52] U.S. Cl. .............. 254/86 R, 254/45, 280/150.5
[51] Int. Cl. .............................................. B60s 9/02
[58] Field of Search ................. 254/86 R, 86 H, 45; 280/150.5; 212/145

[56] References Cited
UNITED STATES PATENTS

| | | | |
|---|---|---|---|
| 3,189,322 | 6/1965 | Hadek | 254/86 R |
| 2,523,152 | 9/1950 | Seyforth | 254/86 R |
| 3,523,698 | 8/1970 | Bishop | 254/86 R |

Primary Examiner—Othell M. Simpson
Assistant Examiner—Robert C. Watson
Attorney—John E. McGarry

[57] ABSTRACT

A vehicle support system for supporting the front and/or back end of travel vehicles and the like. The system includes first and second screw jack assemblies secured to the vehicle and a means to drive the jacks simultaneously with an equal torque into ground engaging position for self-leveling and lifting of the support system on any terrain. The jacks have drive shafts which drive extensible jack elements in the same direction when the drive shafts are rotated in opposite directions. A motor having an output shaft is mounted for free rotation with respect to the vehicle. The motor output shaft is coupled to one drive shaft and the motor housing is coupled to the other drive shaft.

9 Claims, 4 Drawing Figures

FIG. I

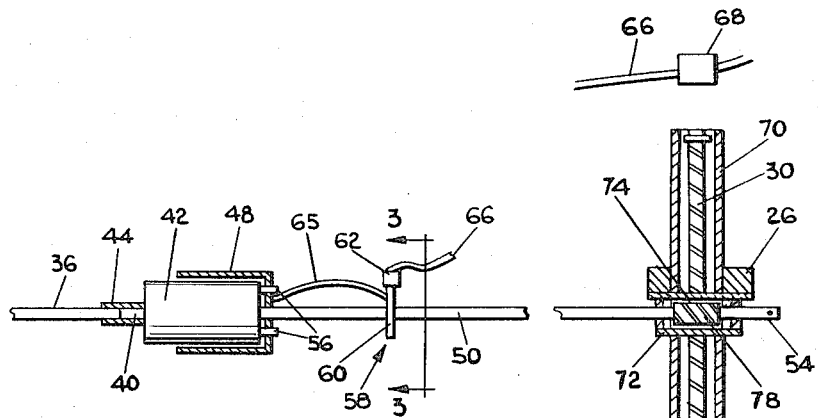
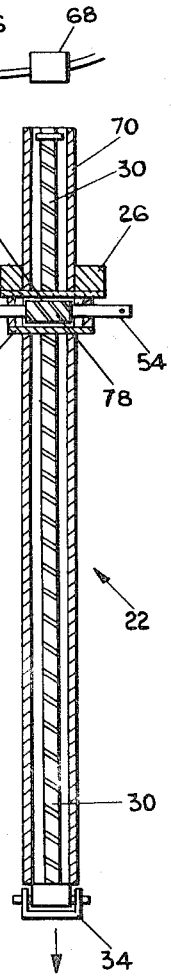
FIG. 2
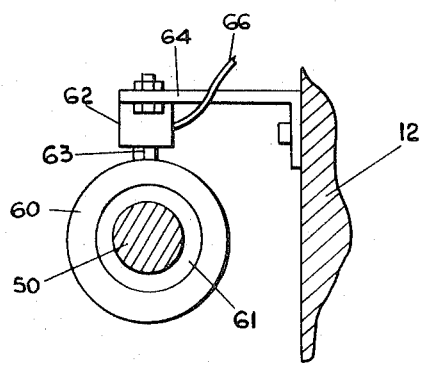
FIG. 3
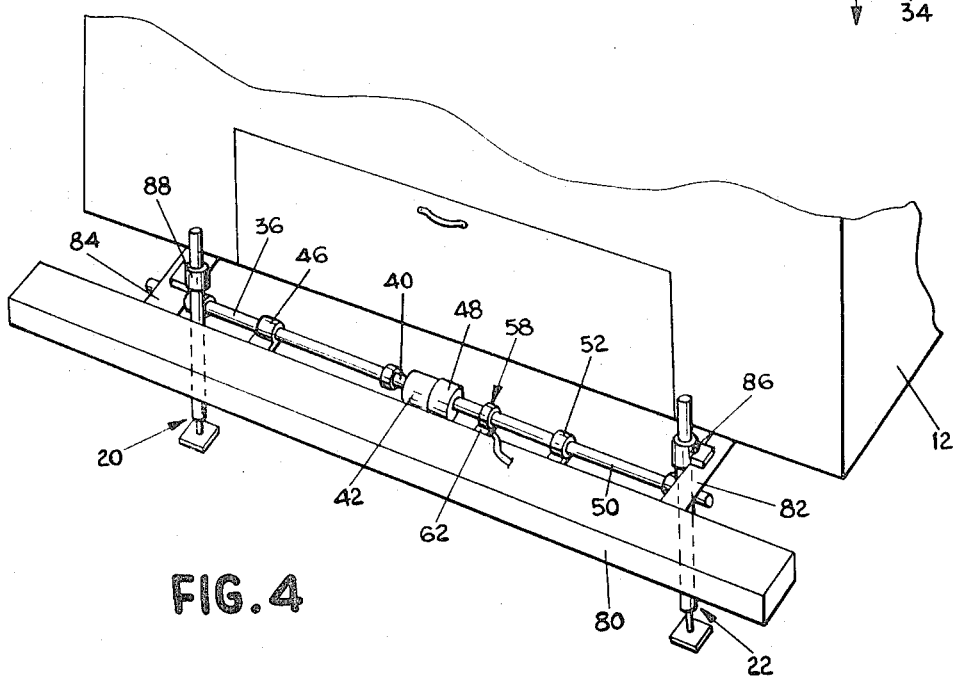
FIG. 4

VEHICLE SUPPORT SYSTEM

BACKGROUND OF THE INVENTION

1. Field of the Invention

This invention relates to vehicle support system for supporting and raising vehicles when the vehicles are parked. In one of its aspects, the invention relates to a support system for a travel trailer vehicle.

2. State of the Prior Art

Recreational travel vehicles of increasingly larger size are becoming more common. Some of these travel vehicles are 30 feet long and are towed by a fifth wheel assembly in the back of a pickup truck. These larger travel trailers require more sophisticated systems for jacking and supporting both the front and back ends thereof when the vehicles are parked for use.

Normally, two jacks are provided at a front portion of the vehicle and, frequently, two additional jacks are provided at a back portion of the vehicle for stabilization. One such system employs hand powered jacks of the screw jack type which are driven by hand operated cranks. Another system uses hydraulic cylinders which are driven simultaneously by a hand or motor operated pump.

Other systems for jacking semitrailers are well known. For example, Dalton in U.S. Pat. No. 3,182,956 discloses a landing gear structure for semitrailers wherein four separate jacks are driven by four separate motors. Each motor is operated independently to level the trailer and then raise the trailer uniformly.

Another landing gear system for semitrailers is disclosed in the U.S. Pat. No. 2,523,152 to Seyferth. The Seyferth system uses a pair of screw jacks driven simultaneously by a hand crank to lower two sets of ground engaging wheels at an equal speed.

SUMMARY OF THE INVENTION

According to the invention, a pair of jacks, preferably of the screw jack type, are driven by a common motor which is freely rotatable with respect to the vehicle. One of the jacks is coupled directly to the casing of the motor and is driven thereby. The other jack is coupled to and driven by the output shaft of the motor. The motor casing and the motor output shaft rotate in opposite directions to drive the jacks with equal torque in the same direction. When one of the jacks engages the ground, it will stop its movement but the other will continue until it strikes the ground. The jacks then will lift the vehicle evenly to maintain the vehicle in a level condition regardless of the slope of the terrain.

BRIEF DESCRIPTION OF THE DRAWINGS

The invention will now be described with reference to the accompanying drawings in which:

FIG. 2 is a partial front elevational view of the assembly shown in FIG. 1;

FIG. 3 is a partial sectional view taken along lines 3—3 of FIG. 2; and

FIG. 4 is a perspective view of the self-leveling screw jack assembly in an alternate position at a rear portion of a recreational vehicle.

DESCRIPTION OF THE PREFERRED EMBODIMENTS

Figure 1:
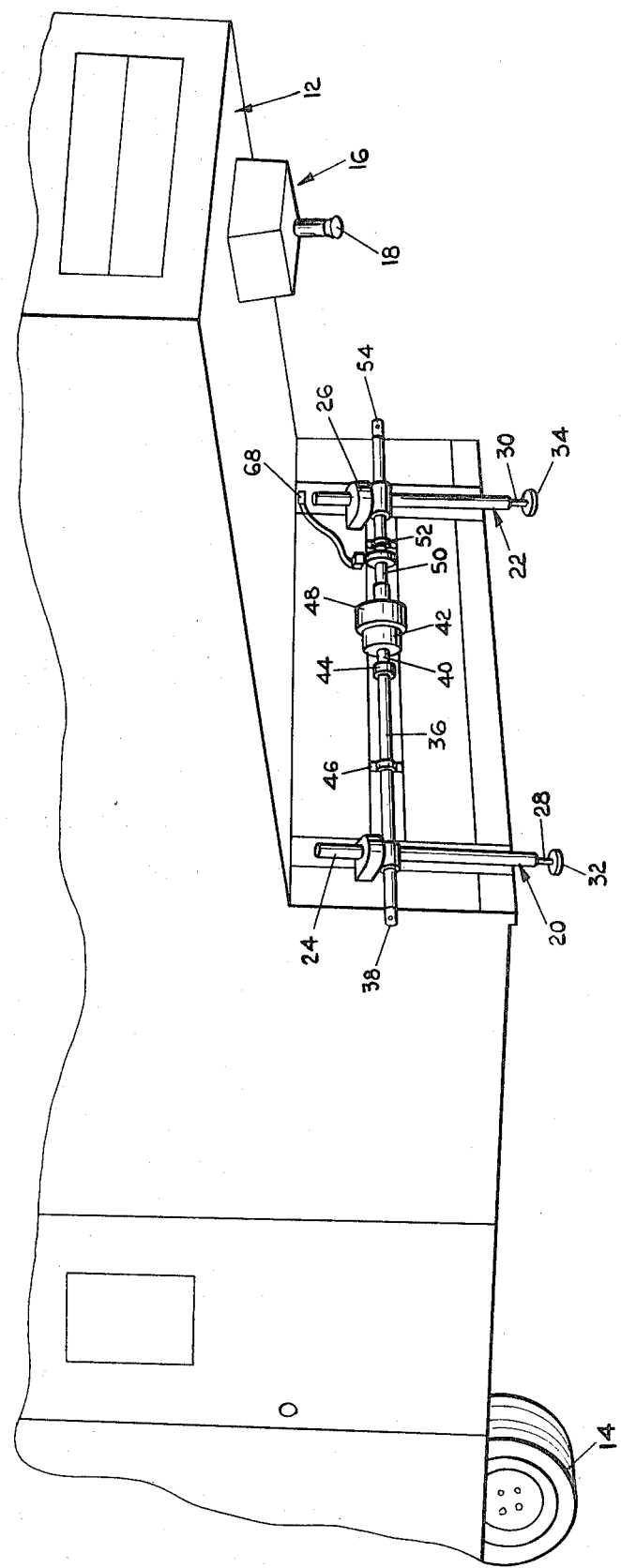
FIG. 1 is a perspective view of a front portion of a recreational trailer illustrating a self-leveling screw jack assembly according to the invention.

The invention will now be described with reference to the drawings, and with respect to FIGS. 1–3 in particular, wherein there is shown a recreational trailer 12 having ground engaging wheels 14 at a rearward portion of the vehicle and a hitch assembly 16 at a front portion of the vehicle. A kingpin 18 extends down from the hitch assembly 16 for engaging the fifth wheel of a tractor vehicle (not shown) adapted to pull the trailer. The tractor vehicle can be, for example, a pickup truck with a fifth wheel mounted in the bed thereof as is common now in some types of recreational vehicles.

Screw jack assemblies 20 and 22 are mounted at either side of the front of the recreational trailer 12 through brackets 24 and 26 respectively. The jack assemblies 20 and 22 have screw shafts 28 and 30 respectively extending from a lower portion thereof and have feet 32 and 34, respectively, pivotably mounted on the ends thereof.

Each of the screw jack assemblies 20 and 22 are conventional in construction and of the type wherein the vertically disposed screw shafts 28 and 30 are driven by horizontal drive shafts. To this end, a drive shaft 36 drives the screw shaft 28 to extend and retract the same from the bottom of the jack assembly 20. The drive shaft 36 has an end 38 adapted for a crank handle (not shown) in a well known fashion so that the screw shaft 28 can be raised and lowered by hand if desired. The drive shaft 36 is coupled to a motor shaft 40 of motor 42 through a suitable coupling 44. A bearing mount 46 is secured to the vehicle and rotatably supports the drive shaft 36 for rotation about its longitudinal axis.

The motor 42 is supported by a cup-like bracket 48 through suitable fasteners 56. A drive shaft 50 is secured to the bracket 48 and is rotatably supported by a bearing mount 52, also secured to the vehicle wall. The drive shaft 50 is connected to the screw shaft 30 for operating the same and has an outer end 54 for engaging a crank handle (not shown) so that the screw shaft 30 can also be raised and lowered manually if desired.

Electrical power is supplied to the motor 42 through a slip ring assembly 58 and brush assembly 62. As illustrated in FIG. 3, the brush assembly 62 is supported by a bracket 64 which is secured at its inner end to the wall of the vehicle 12 through suitable fastening means. The slip ring assembly 58 comprises a ring 60 mounted on the drive shaft 50 through an insulating collar 61. The brush assembly 62 has a plurality of brushes 63 depending therefrom, which brushes engage the ring 60 to transfer electrical power from the brush assembly 62 to the ring 60. Electrical wires 65 carry the electrical power from the ring 60 to the motor 42. Electrical wires 66 carry power from a switch 68, connected to a voltage source (not shown) such as a battery, to the brush assembly 62.

In most instances, the motor 42 will be driven from a 12-volt battery source which is available, for example, in many travel trailers. Alternately, the motor 42 can be driven by any automobile or truck electrical system. Accordingly, the motor 42 desirably is a direct current reversible motor.

The screw jack assembly 22 will now be described in detail with reference to FIG. 2. The jack assembly 22 has a hollow outer tube 70 which is secured to a gear housing 72. The bracket 26 is secured to the gear housing 72 through suitable fastening means (not shown) to rigidly support the hollow outer tube 70 on the front portion of the trailer 12. The threaded screw shaft 30 is mounted within the hollow outer tube 70 and threadably engages an annular nut 74 which is mounted for rotation about a vertical axis within the gear housing 72. The nut 74 is externally threaded and threadably engages a worm gear drive 78 on the drive shaft 50. Thus, rotation of the drive shaft 50 will rotate the nut 74 which drives the screw shaft 30 upwardly or downwardly depending on the direction of the rotation of the drive shaft 50.

The jack assembly 20 is of identical construction to the jack assembly 22 with the exception of the gearing. The pitch of the corresponding worm gear drive of jack assembly 20 must be opposite from that of the worm gear 78 so that both of the screw shafts 28 and 30 move in the same direction at the same time. For example, rotation of the drive shaft 50 in one direction will drive downwardly the screw shaft 30 whereas rotation of the drive shaft 36 in the opposite direction will drive downwardly the screw shaft 28.

In operation, when it is desirable to jack up the front portion of the vehicle, the motor 42 is turned on so that a torque is applied to the motor shaft 40 in a manner so as to rotate the drive shaft 36 and drive downwardly the screw shaft 28. However, the motor 42 is mounted for rotation about the axis passing through the motor shaft 40. Accordingly, the motor 42 may rotate about the axis passing through the drive shaft 50 and thereby rotate the drive shaft 50. The rotation of the motor 42 and the motor shaft 40 will depend on the reaction from the screw shafts 28 and 30. For example, at the start of the operation where both of the screw shafts are in the raised position, there will be virtually no reaction from the screw shafts 28 and 30. The resistance to rotation will be purely of a frictional nature. Assuming the frictional forces to be the same, the motor 42 and the motor shaft 40 will rotate in opposite directions at about equal absolute rotational speeds, thereby driving the drive shafts 50 and 36 in opposite rotational directions to drive downwardly the screw shafts 30 and 28 respectively at about equal speeds. If the recreational trailer 12 is positioned on slightly uneven ground, one of the feet 32, 34 will strike the ground before the other one. At that point, that screw shaft will exhibit a greater resistance than the other and the other will continue downwardly until it also strikes the ground. For example, in the event that foot 34 of screw shaft 30 strikes the ground first, motor 42 will will stop turning but the motor shaft 40 will continue to be driven, rotating the drive shaft 36 to drive downwardly the screw shaft 28 until the foot 32 also strikes the ground. At that point, an equal reaction results from each of the screw shafts 28 and 30 so that the motor 42 and the motor shaft 40 will once again be driven at equal speeds in opposite directions to drive downwardly at an equal rate the screw shafts 28 and 30. This continued action will result in evenly raising the front portion of the trailer.

If the frictional forces are not the same, one of the screw shafts will be driven ahead of the other, but only until the one strikes the ground. The other then will be driven downwardly to strike the ground. Thereafter, the frictional resistance to turning of the drive shafts 36 and 50 will be small compared to the reaction resulting from lifting of the trailer body and, thus, the drive shafts 36 and 50 will thereafter be driven at equal speeds.

Desirably, the jack assemblies 20 and 22 are of the self-locking nature so that when the motor is turned off, the jack assemblies will maintain their position.

When the trailer is to be lowered and the screw shafts 28 and 30 are to be raised, the switch 68 is thrown in an opposite manner so that the motor 42 applies a torque in the opposite direction to the motor shaft 40. Thus, the motor 42 and the motor shaft 40 will rotate in opposite directions to each other and in opposite directions with respect to the initial operation which drives the screw shafts 28 and 30 downwardly. In this manner, the screw shafts 28 and 30 will be driven upwardly at an equal rate until such time as one or both of the screw shafts reach the uppermost position of travel. If one of the screw shafts, for example screw shaft 30, returns to its uppermost position, then motor 42 will discontinue its rotation and the motor shaft 40 will continue to turn until the screw shaft 28 reaches its uppermost position.

Reference is now made to FIG. 4 which illustrates the dual jack assembly of the invention mounted on a rear portion of a travel vehicle. In FIG. 4, like numerals have been used to designate like parts.

The vehicle 12 has a bumper 80 extending rearwardly therefrom and supported by bumper supports 82 and 84. A screw jack 20 is mounted to the bumper support 84 through a support bracket 88. Likewise, a screw jack assembly 22 is mounted on bumper support 82 through a bracket 86. The screw jack assembly 20 is driven by drive shaft 36 which is mounted for rotation within a bearing mount 46 attached to the inside of the bumper 80. In similar manner, the drive shaft 50 operates the screw jack 22 and is mounted for rotation within bearing mount 52, also secured to the inside of the bumper 80. A brush holder 62 is mounted on the inside of the bumper 80 to transmit electrical current to a slip ring 58 on the drive shaft 50 in a manner described above. A motor 42 is secured to the drive shaft 50 through bracket 48 and drives a motor shaft 40 which, in turn, is connected to the drive shaft 36.

The jack assembly illustrated in FIG. 4 operates in identical manner to the assembly illustrated in FIGS. 1–3 except that the rear portion of the vehicle is raised as compared with the front portion for the assembly of FIGS. 1–3.

The jack assemblies according to the invention provide a motorized means for quickly raising and lowering a front or rear portion of a recreational travel trailer. The trailer is raised evenly and is leveled automatically by virtue of the free mounting of motor 48. Additionally, means are provided for operating the jack assembly by hand in the event that electrical power is unavailable.

The jack assemblies can be incorporated into the recreational vehicle during the manufacture thereof or can be installed easily in the vehicle after manufacture thereof.

Reasonable variation and modification are possible within the scope of the foregoing disclosure, the drawings and the appended claims without departing from the spirit of the invention.

The embodiments of the invention in which an exclusive property or privilege is claimed are defined as follows:

1. A vehicle support assembly for retractably supporting an end of a vehicle body and the like; said vehicle support assembly comprising:

first and second jacks, each of said jacks including a housing, an extendible member, and a drive shaft rotatable to extend and retract said extendible member with respect to said housing;

means for mounting said jacks to said vehicle body in spaced relationship with respect to each other;

a motor having a casing and an output shaft rotatably driven with respect to said casing;

means coupling said motor output shaft of said motor to said first jack drive shaft;

means coupling said motor casing to said second jack drive shaft so that said extendible member of said first and second jacks are driven in the same direction by rotation of said motor output shaft in one direction and rotation of said motor casing in an opposite direction; and said motor casing being freely rotatable with respect to said vehicle body so that each of said extendible members are driven downwardly with equal force by said motor, regardless of the terrain beneath said jacks.

2. A vehicle support assembly according to claim 1 wherein said first jack includes means to drive the extendible member thereof downwardly upon rotation of the drive shaft thereof in a first rotational direction, and said second jack includes means to drive the extendible member thereof downwardly upon rotation of the drive shaft thereof in an opposite direction.

3. A vehicle support assembly according to claim 1 and further comprising means for supporting said motor casing and said motor output shaft for rotation with respect to said vehicle body.

4. A vehicle support assembly according to claim 3 and further comprising means to supply electrical power to said motor, said power supply means including a ring mounted on said casing coupling means for movement therewith, and a brush mounted on said vehicle body in operative contact with said ring to transfer electrical power thereto.

5. A vehicle support assembly according to claim 4 and further comprising means to lock said output shafts in selective extended positions when said motor is inoperative.

6. A vehicle support assembly according to claim 1 wherein said first and second jacks are screw jacks including a nut rotatably driven by said drive shafts, said extendible member is externally threaded and threadably engages said nut to be driven thereby.

7. A vehicle support assembly according to claim 1 wherein said jacks are mounted to a front portion of said trailer.

8. A vehicle support assembly according to claim 1 wherein said jacks are mounted to a rear portion of a trailer.

9. A vehicle support assembly according to claim 1 wherein said drive shafts of said first and second jacks are axially aligned.

* * * * *